No. 643,740. Patented Feb. 20, 1900.
J. T. CECIL.
MACHINE FOR DIGGING POTATOES.
(Application filed July 6, 1898.)
(No Model.) 4 Sheets—Sheet 3.
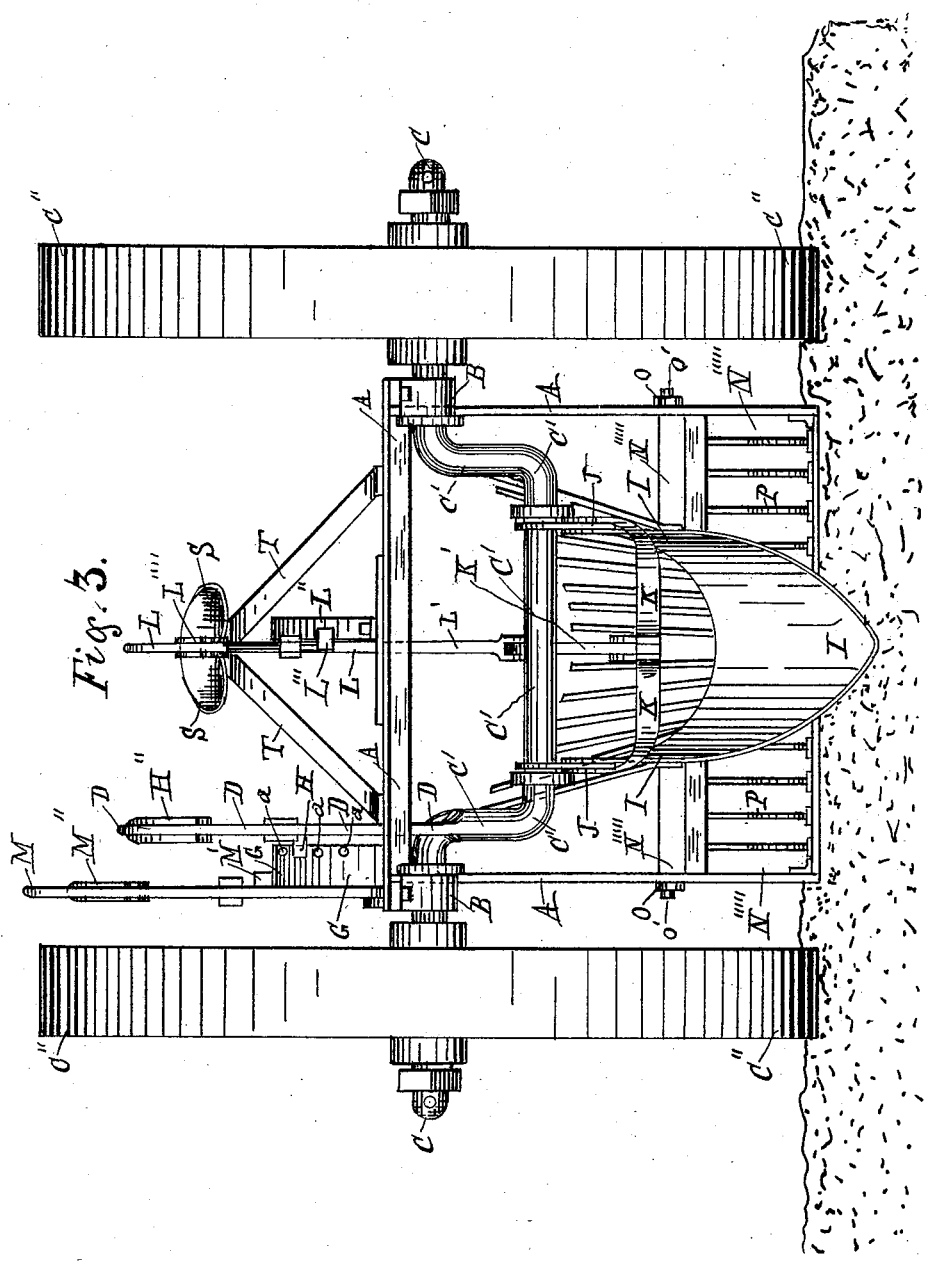
WITNESSES.
John Satterwhite
J. S. Cannon
INVENTOR.
James Tully Cecil
By St. John Day.
Attorney.

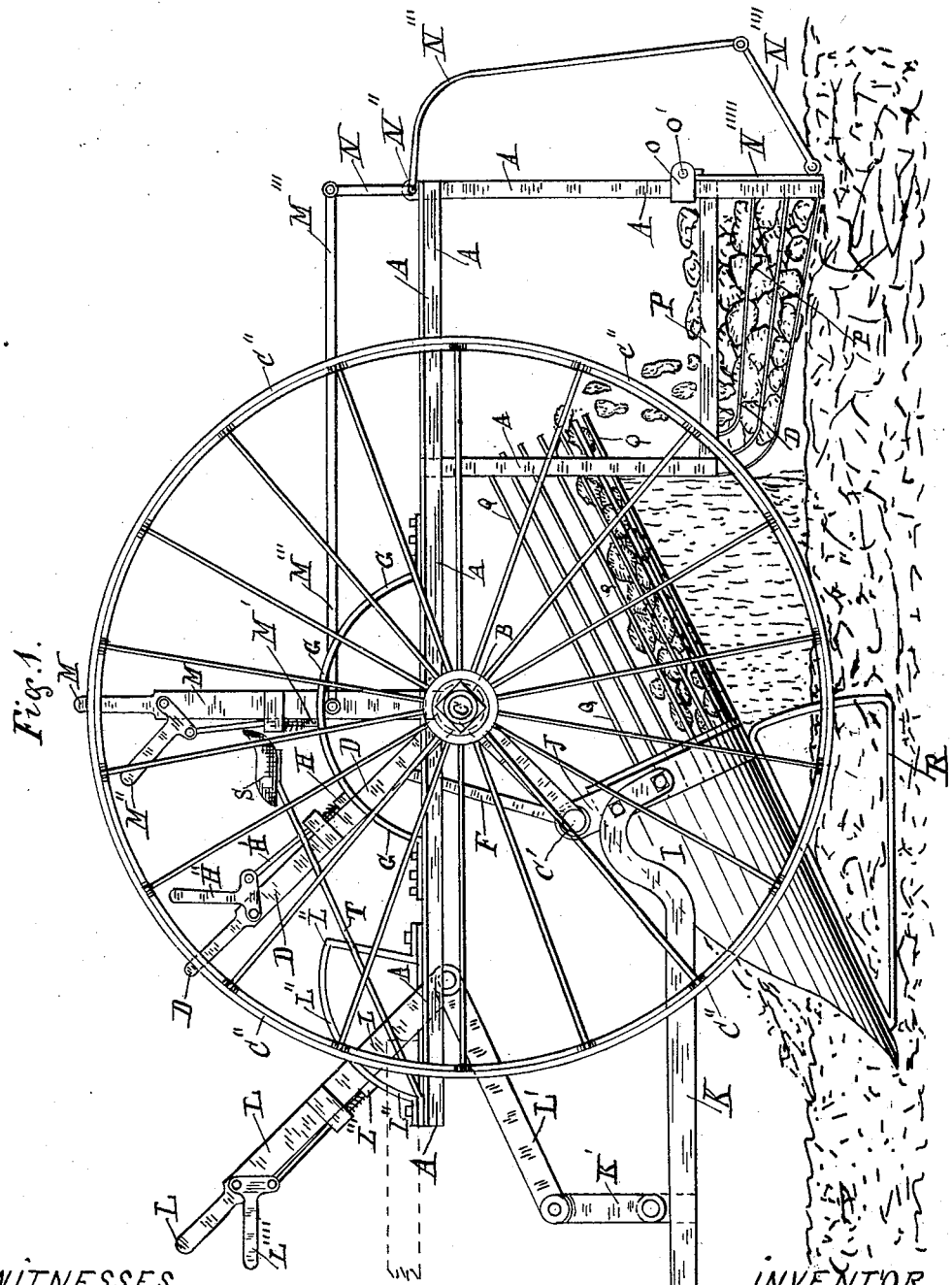

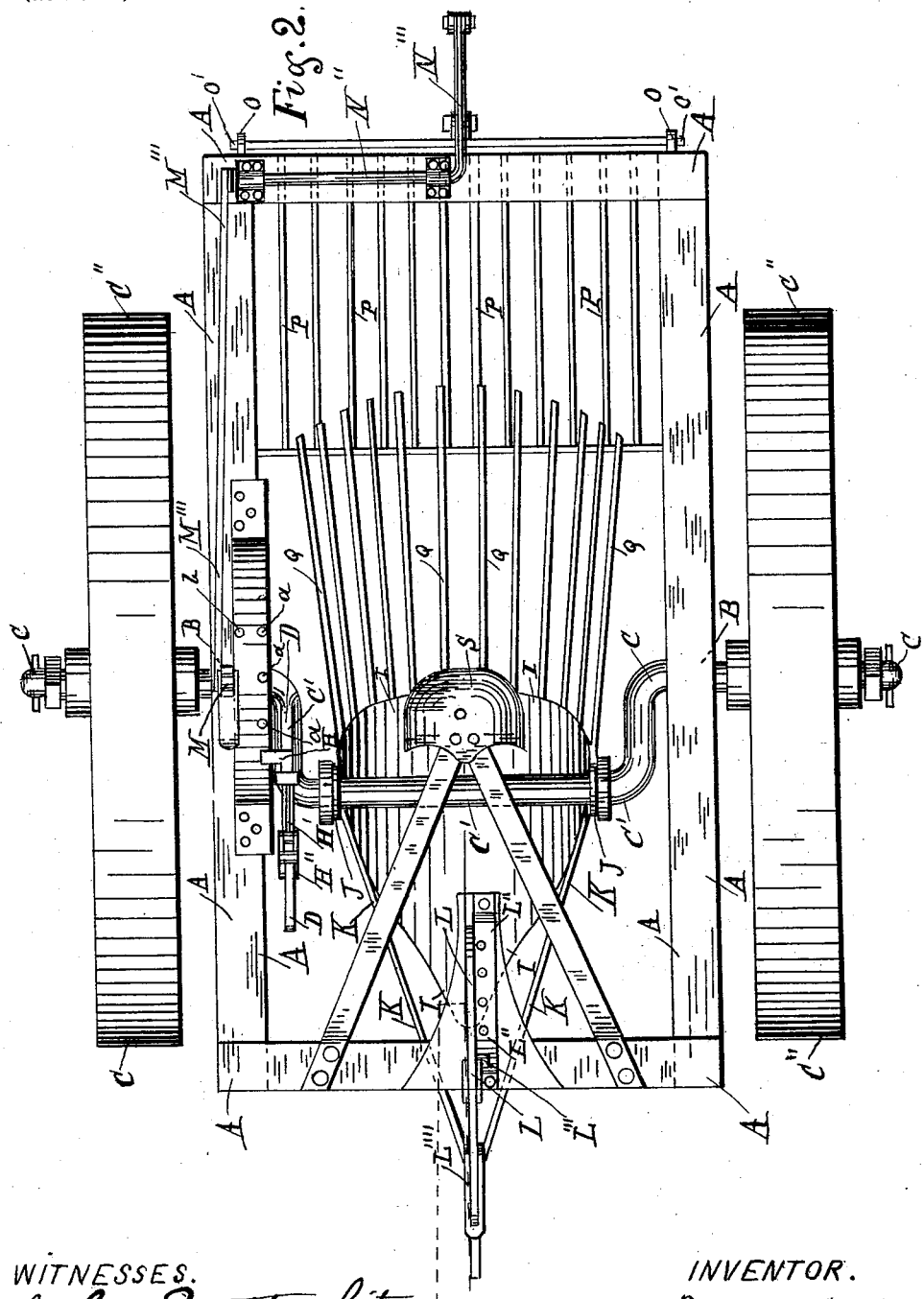

No. 643,740. Patented Feb. 20, 1900.
J. T. CECIL.
MACHINE FOR DIGGING POTATOES.
(Application filed July 6, 1898.)
(No Model.) 4 Sheets—Sheet 4.
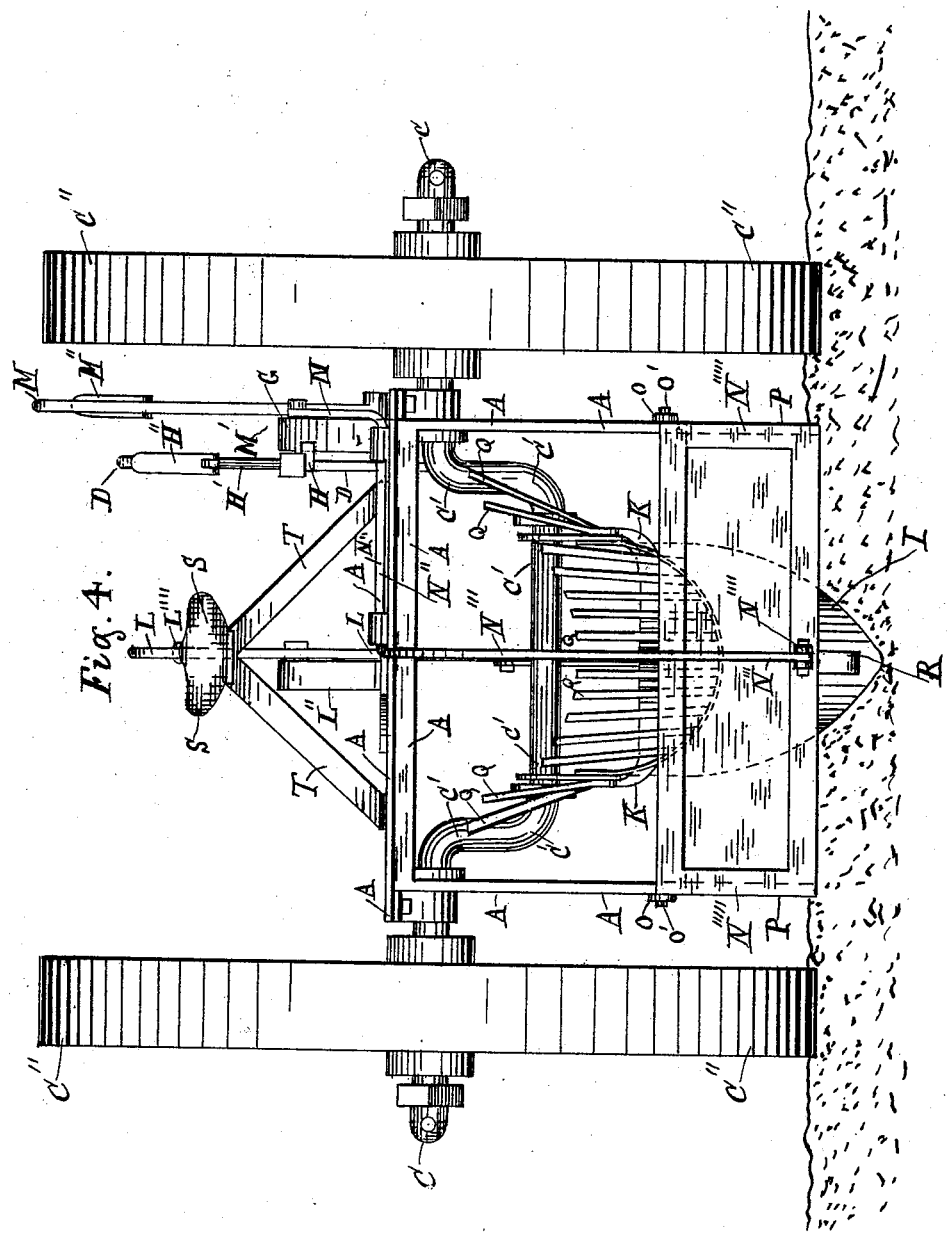
WITNESSES.
John Satterwhite
J. S. Cannon
INVENTOR.
James Tully Cecil
By St. John Day.
Attorney

UNITED STATES PATENT OFFICE.

JAMES TULLY CECIL, OF LOS ANGELES, CALIFORNIA.

MACHINE FOR DIGGING POTATOES.

SPECIFICATION forming part of Letters Patent No. 643,740, dated February 20, 1900.

Application filed July 6, 1898. Serial No. 685,286. (No model.)

*To all whom it may concern:*

Be it known that I, JAMES TULLY CECIL, a citizen of the United States of America, residing in the city of Los Angeles, in the county of Los Angeles and State of California, have invented a certain new and useful Potato-Digger, of which the following is a full, clear, and exact description or specification, reference being had to the annexed sheets of drawings, forming part hereof, and to the letters marked thereon.

My new or improved machine for digging potatoes has for its object to move a scoop or digging device at a sufficient depth in the ground and which is made of sufficient width that as it progresses through the ground it removes as far as possible the whole of the potato crop and while doing so separates the earth from the potatoes by causing them, through the act of the traveling of the machine, to move upon the inclined upper surface of the scoop or digging device, and thus continue to move upward over bars attached to or forming part thereof. The loosened earth or soil falls down between these bars, the openings between which, while being wide enough to allow the earth or soil to fall therethrough easily, are yet narrow enough to prevent the potatoes from falling therethrough. The continued progress of the machine in working causes the potatoes to continually ascend up over these inclined bars, and on reaching the upper end thereof the potatoes fall over into a receptacle made of metallic bars close enough together to prevent the potatoes passing through the space between the bars. The rear end of this receptacle is provided with a hinged door, which on being opened allows the potatoes to fall out upon the ground in a heap or layer, this door being opened by the operator of the machine when the quantity of potatoes collected in the receptacle is sufficient to fill a sack, as hereinafter more fully explained, and this discharging operation of the potatoes therefore takes place at intervals—that is to say, whenever about a sackful of potatoes is contained in the said receptacle.

The aforesaid scoop or digging device is suspended from a crank-shaft carried in bearings near the middle of the framing of the machine, and on the outer ends of this crank-shaft the wheels whereon the machine is traveled by horses or by mechanical traction are carried so as to turn loosely upon the ends of the crank-shaft, which when in operation occupies a stationary position in relation to the machine. The framing of the machine is rectangular and preferably made of angle-iron of sufficient width and depth to give it the necessary stiffness.

From the front part of the framing of the machine spring-bars are carried, upon the inner and upper end of which is a seat for the operator of the machine to sit upon. From this position the operator can conveniently actuate the three adjusting-levers and spring-catch devices by which the several parts of the machine are operated. Two of these are on the right-hand side of the operator and the third is attached to the front part of the framing, therefore in front of the operator. One of the operating-levers and spring-catch devices is attached to the crank-shaft, and the operator by means of this depresses or raises the crank, together with the scoop or digging device and its attachments—that is to say, by depressing the said lever the operator regulates the depth to which the scoop or digging device enters the soil, and the spring-catch attachment, which engages with a hole in a reversing-quadrant, holds the scoop or digging device in that depressed position, or, when out of use, by the said reversing-lever being pulled back to its normal or vertical position the scoop or digging device is raised up out of the ground. The scoop or digging device is also provided with arms for the attachment thereto of a doubletree, and the front lever has its shorter arm connected by means of a link to the outer end of these doubletree-arms. By pushing this lever forward the doubletree-arms are still further depressed and rigidly maintained in the depressed position, so that the scoop or digging device is securely maintained at its operating depth in the soil. By pulling this front lever back into its normal position the doubletree-arms and the front portion of the scoop or digging device are correspondingly raised. The third reversing-lever is connected by means of a link and crank-arm to the door of the receptacle, wherein the potatoes are collected, so that the operator when the receptacle is full of potatoes by pushing this lever forward opens the door of the receptacle, when the potatoes discharge themselves from the machine by the action of gravity. The front part of the machine is provided with a tongue for the purpose of connecting it with the harness of horses when horses are used to operate the machine; but when mechanical haulage is used for operating the machine this tongue is dispensed with.

Upon the annexed sheets of drawings, Figure 1 is a side elevation of my new or improved machine for digging potatoes. Fig. 2 is a plan of the same. Fig. 3 is a front elevation of the same. Fig. 4 is a rear elevation of the same.

In the drawings the main framing of the machine is marked A, at or near the center part of which it is provided with bearings B, whereby it is attached to and supported upon the crank-shaft C, on the outer ends of which the carrying-wheels C" rotate. To the crank-shaft C a reversing-lever D is attached, as shown, such lever being made either in one piece with the said crank-shaft or attached thereto, while its position in relation to the crank C' is maintained and stiffened by means of the link or connecting-piece F. Upon the right-hand side of the framing A there is carried the reversing or stop quadrant G, and the lever D is provided with a reversing-catch H, attached by the rod H' to the handle H", the catch H having a rounded projection which engages with any one of the holes $a$. (Shown more particularly in Fig. 2.) The scoop or digging device I is carried upon the crank C' by means of the link-straps J, which are formed with removable eyes in their upper part, so that it can be easily attached to or detached from crank C'. The scoop I is also provided with the arms K, upon the outer end of which a doubletree (not shown in the drawings) is carried for attaching horses thereto. These arms K are connected by the link K' to the lower arm L' of the lever L, so that when the lever L is depressed into the position shown in Fig. 1 the scoop or digging device I is firmly held down at the proper depth in the soil by the joint action of the crank C', operated by the reversing-lever D, as hereinbefore described, and the lever L, which is also engaged in one of the retaining-holes in the quadrant L" by the round portion of the retaining-catch L'" entering one of the said holes. The retaining-catch L'" is operated from or by the handle L"" in the same manner as the handle H" of the lever D is operated. The third lever M is carried upon a stud in the framing A, (not seen in the drawings,) and it is situated upon that side of the quadrant G opposite the side where the lever D is situated. Its construction and the construction of its retaining-catch M', a circular projection, also its handle M" for operating the catch M', being similar to the corresponding parts of the levers D and L, need not be herein further referred to excepting to add that the quadrant G is formed with one or more holes $b$ for the cylindrical part of the retaining-catch to engage in. This lever M is coupled by the link M'" to the upper end of the crank N, carried upon the shaft N". The other end of the shaft N" carries the arm N'", connected to the link N"", attached to the door N""", the door N""" being carried on pivots O' in the plates O, attached to the framing of the machine. Thus it will be seen that by moving the lever M into the forward position the door N""" is caused to turn upward on its pivots O' in the bearings O, so that the potatoes in the bar-receptacle P slide out from the said receptacle upon the ground as the machine continues its forward course.

In the elevation of my potato-digging machine (shown at Fig. 1) the potatoes are represented as being moved up over the inclined bars Q, which constitute an upward inclined extension of the scoop I. As they ascend up over the bars the soil which is moved up with them falls between the bars and returns to the ground, while the potatoes are discharged into the receptacle P.

For the purpose of giving rigidity to the scoop I in operating its under side is provided with the guide R, (shown more particularly in Fig. 1,) which consists of a triangular frame of metal of narrow width attached to the under side of the scoop or digging device. The operator sits upon the seat S.

Having now described the nature of my said invention and the best system, mode, or manner I am at present acquainted with for carrying same into practical effect, I desire to observe in conclusion that what I consider to be novel and original, and therefore claim as the invention to be secured to me by Letters Patent, is as follows:

1. The potato-digging machine consisting of a scoop suspended from a crank-shaft, whose angular position is adjustable, bars having spaces between them at the upper end of the scoop, the receptacle provided with a discharging-door, the lever for operating the door, the reversing-lever acting in relation to the stop-quadrant for raising or lowering the scoop, the arms on the scoop to whose outer end the hauling-gear is attached, said arms being also connected with a catch-lever and stop-quadrant, whereby said scoop is still further operated and held—the entire machine being supported on carrying-wheels substantially as hereinbefore described and shown upon the annexed drawings.

2. In a potato-digging machine, a crank-shaft and scoop suspended from said crank-shaft and said scoop having bars at its upper end with spaces between them, a shoe having a horizontal surface at its under side, together with arms for attaching horses or hauling-rope thereto for the purpose of propelling the same, substantially as set forth.

3. In a potato-digging machine a crank-shaft and scoop suspended from said crank-shaft, and having bars at its upper end with a shoe having a horizontal surface at its under side, together with arms for attaching horses or hauling power thereto for the purpose of propelling the same, the said scoop with its connections being connected to a lever operating from and in the framing of the machine for the purpose of more securely regulating the depth of its depression in the soil, substantially as set forth.

4. In a potato-digging machine, a crank-shaft and scoop suspended from said crank-shaft having bars at its upper end, a shoe at its under side, and arms for attaching horses or hauling power thereto for propelling the same, said scoop with its attachments being connected to a lever operating from and in the framing of the machine, for the purpose of more securely regulating the depth of its depression in the soil, the said scoop with its connections and frame being mounted on carrying-wheels which roll upon the soil wherein the scoop operates in the manner and for the purposes substantially as set forth.

5. In a potato-digging machine, a crank-shaft and scoop suspended therefrom, having bars at its upper end and a shoe at its under side, arms on the scoop projecting forward, for attaching hauling power to, said scoop and attachments being connected to an operating-lever at the front and mounted on carrying-wheels, being also connected at the rear end to a reversing-lever and stop-quadrant for maintaining the position of the scoop, substantially as described and shown upon the annexed drawings.

6. In a potato-digging machine the combination consisting of a crank-shaft bar, a scoop suspended therefrom, bars at the upper end of the scoop, a shoe at the under side of the scoop, arms on the scoop projecting forward, the operating-lever connected to said scoop, operating-levers at the front of the framing connected to said scoop, the framing, the carrying-wheels, the reversing-lever for maintaining the position of said scoop, the receptacle whereinto the potatoes fall, the door forming the rear vertical side of the receptacle, the lever for operating the door, the rocking shaft, and the link connections of the rocking shaft, all operating in the manner and for the purposes substantially as hereinbefore set forth and shown upon the annexed drawings.

In testimony whereof I have hereunto set my hand in the presence of two subscribing witnesses.

JAMES TULLY CECIL.

Witnesses:
JOHN SATTERWHITE,
ST. JOHN DAY.